United States Patent
Miyake (10) Patent No.: US 11,994,864 B2
(45) Date of Patent: May 28, 2024

(54) REGION REGISTRATION SYSTEM

(71) Applicant: Yanmar Power Technology Co., Ltd., Osaka (JP)

(72) Inventor: Koji Miyake, Osaka (JP)

(73) Assignee: Yanmar Power Technology Co., Ltd., Osaka (JP)

(*) Notice: Subject to any disclaimer, the term of this patent is extended or adjusted under 35 U.S.C. 154(b) by 776 days.

(21) Appl. No.: 17/265,250

(22) PCT Filed: Jun. 21, 2019

(86) PCT No.: PCT/JP2019/024684
§ 371 (c)(1),
(2) Date: Feb. 2, 2021

(87) PCT Pub. No.: WO2020/026638
PCT Pub. Date: Feb. 6, 2020

(65) Prior Publication Data
US 2021/0302972 A1  Sep. 30, 2021

(30) Foreign Application Priority Data
Aug. 3, 2018 (JP) .................. 2018-146974

(51) Int. Cl.
| | |
|---|---|
| *A01B 69/00* | (2006.01) |
| *A01B 63/00* | (2006.01) |
| *A01B 69/04* | (2006.01) |
| *A01C 11/00* | (2006.01) |
| *B60K 17/02* | (2006.01) |
| *G05D 1/00* | (2006.01) |
| *A01B 63/10* | (2006.01) |

(52) U.S. Cl.
CPC ......... *G05D 1/0212* (2013.01); *A01B 63/008* (2013.01); *A01B 69/00* (2013.01);
(Continued)

(58) Field of Classification Search
CPC ..... A01B 69/008; A01B 69/003; A01B 69/00; A01B 69/001; A01B 79/005;
(Continued)

(56) References Cited

U.S. PATENT DOCUMENTS 6,128,574 A * 10/2000 Diekhans ............. G05D 1/0278
    701/410
8,060,299 B2 * 11/2011 Gharsalli ............. G05D 1/0278
    701/425

(Continued)

*Primary Examiner* — Jamie L McGowan
(74) *Attorney, Agent, or Firm* — Chris Mizumoto (57) ABSTRACT

This region registration system is provided with a positioning antenna, a position acquisition unit, a reference-point specification unit, a direction specification unit, a candidate-point registration unit, and a region registration unit, and acquires an antenna position as a measurement point. The reference-point specification unit specifies a corner antenna reference point. The direction specification unit specifies a turning direction of a rice seedling transplanter that has passed the corner antenna reference point. The candidate-point registration unit biases the corner antenna reference point to a position forward of the rice seedling transplanter at the time of measuring said corner antenna reference point, and at the same time, registers, as a corner candidate point, a position biased toward either side in the width direction of said rice seedling transplanter in accordance with the turning direction specified by the direction specification unit. The region registration unit is capable of registering a region that encompasses a corner candidate point.

4 Claims, 7 Drawing Sheets

(52) U.S. Cl.
CPC .......... *A01B 69/008* (2013.01); *A01C 11/003* (2013.01); *B60K 17/02* (2013.01); *A01B 63/10* (2013.01)

(58) Field of Classification Search
CPC .. A01B 63/008; G05D 1/0088; G05D 1/0212; G05D 1/0219; G05D 1/0278; G05D 1/02; G05D 1/0274; A01C 11/003
See application file for complete search history.

(56) References Cited

U.S. PATENT DOCUMENTS

| | | | | |
|---|---|---|---|---|
| 8,131,432 B2* | 3/2012 | Senneff | ................ | A01B 69/007 701/437 |
| 8,170,785 B2* | 5/2012 | Diekhans | ............. | G05D 1/0291 701/25 |
| 8,510,040 B2* | 8/2013 | Nesbitt | ............... | G01C 21/3446 701/410 |
| 8,606,469 B2* | 12/2013 | Brunnert | ............... | A01D 41/127 701/1 |
| 9,097,527 B2* | 8/2015 | Notstrand | ........ | G08G 1/096827 |
| 9,772,625 B2* | 9/2017 | Gilmore | ................ | G06Q 10/06 |
| 9,795,074 B2* | 10/2017 | Stratton | ............... | A01B 79/005 |
| 10,754,342 B2* | 8/2020 | Tomita | ................. | G05D 1/0274 |
| 2016/0100522 A1* | 4/2016 | Yamauchi | ............ | G05D 1/0212 701/25 |
| 2017/0223889 A1* | 8/2017 | Cavender-Bares | ........................ | G05D 1/0088 |
| 2017/0357261 A1* | 12/2017 | Foster | .................... | A01B 69/00 |
| 2018/0373264 A1* | 12/2018 | Madsen | ............... | A01B 69/008 |
| 2019/0146513 A1* | 5/2019 | Tomita | ................. | G05D 1/0088 701/50 |
| 2020/0064144 A1* | 2/2020 | Tomita | .................... | A01D 69/00 |

\* cited by examiner

REGION REGISTRATION SYSTEM

CROSS-REFERENCE

This application is a US National Stage Application under 35 U.S.C. § 371 of International Application No. PCT/JP2019/024684 filed Jun. 21, 2019, which claims foreign priority of JP2018-146974 filed Aug. 3, 2018, the disclosures of which are hereby incorporated by reference in their entirety.

TECHNICAL FIELD

The present invention mainly relates to a region registration system that causes a work vehicle to travel along a predetermined region, thereby registering the region.

BACKGROUND ART

In Patent Literature 1, it is described that, by causing a work vehicle provided with an antenna that receives a positioning signal from a positioning system to travel along the outer periphery of a working region inside a field, the position and shape of the working region is registered. In Patent Literature 1, it is described that, in order to prevent the edge of the working region from becoming rounded when two straight paths are connected by a turning path, the working region is registered by extending the two straight line sections and then using the point at which the lines intersect. Further, in Patent Literature 1, it is described that the position of the antenna, which is detected based on the positioning signal, is offset and corrected.

CITATION LIST

Patent Literature

Patent Literature 1: Japanese Unexamined Patent Application No. 2017-127291

DISCLOSURE OF INVENTION

Problems to be Solved by the Invention

Here, the reason for adopting a method that registers a region following actual travel of the work vehicle rather than a method that registers the region on a map is so that the region is registered after confirming that the corresponding section actually exists inside the field as a region that can be traveled. However, because Patent Literature 1 only describes the registration of a region that contains an intersection of two straight paths that have been extended, there is a possibility that positions that do not exist inside the field as a region that can actually be travelled may become registered as the region.

The present invention has been made in view of the above circumstances, and a primary object thereof is to provide, in a region registration system that registers a region made up of positions that have actually been traveled by a work vehicle, a configuration which is capable of accurately specifying the corners of the region.

Means for Solving the Problems

The problems to be solved by the present invention are as described above, and the means for solving the problem and the effects thereof will be described below.

According to an aspect of the present invention, a region registration system having the following configuration is provided. That is to say, a region registration system is provided that, in order to register all or part of a region of a field, causes a work vehicle to travel along an outer periphery of the region, thereby registering the region. The region registration system includes a positioning antenna, a position registration unit, a reference-point specification unit, a direction specification unit, a candidate-point registration unit, and a region registration unit. The positioning antenna is attached to the work vehicle, and receives a positioning signal from a positioning system. The position registration unit registers, based on the positioning signal, an antenna position representing a position of the positioning antenna as a measurement point. The reference-point specification unit specifies a corner antenna reference point, which is a measurement point taken while the work vehicle is traveling along the outer periphery of the region, and is a position that has been determined to correspond to a corner of the region. The direction specification unit specifies a turning direction of the work vehicle after passing the corner antenna reference point. The candidate-point registration unit offsets the corner antenna reference point to a position forward of the work vehicle at the time of measuring the corner antenna reference point, and registers, as a corner candidate point, a position offset toward either side in the vehicle width direction of the work vehicle in accordance with the turning direction specified by the direction specification unit. The region registration unit is capable of registering a region containing the corner candidate point.

As a result, because a position obtained by offsetting the position of the traveling work vehicle by a predetermined amount is registered as a corner candidate point, it is possible to register the region based on a position that exists with certainty inside the field. Furthermore, as a result of changing the offset direction according to the turning direction, a position that corresponds to the actual region can be automatically registered.

In the region registration system, the reference-point specification unit preferably specifies, as the corner antenna reference point, the measurement point acquired at a timing at which the work vehicle is switched from forward movement to backward movement.

When the work vehicle is switched from forward movement to backward movement, a plurality of positions of the work vehicle is registered before and after making the switch. Therefore, by using the measurement point acquired at the timing at which switching occurs from forward movement to reverse movement as the corner antenna reference point, it is possible to use only an appropriate position as the corner candidate point.

The region registration system described above preferably has the following configuration. That is to say, the work vehicle includes a working unit, a drive unit, and a working clutch. The working unit performs agricultural work. The drive unit drives the working unit. The working clutch can be switched between a clutched state, in which power from the drive unit is transmitted to the working unit, and a declutched state, in which power from the drive unit is not transmitted to the working unit. The reference-point specification unit specifies, as the corner antenna reference point, the measurement point acquired at a timing at which the working clutch is switched from the clutched state to the declutched state.

As a result, an accurate corner candidate point can be registered even when the region is registered while agricultural work is being performed by the working unit. Furthermore, positions in which agricultural work can actually be performed can be included in the region.

The region registration system described above preferably has the following configuration. That is to say, the work vehicle is a rice seedling transplanter provided with a planting unit that plants seedlings. The rice seedling transplanter includes a lifting/lowering device that changes a height of the planting unit between a lowered position, where the planting unit is lowered to perform planting work, and a lifted position, where the planting unit is lifted and planting work is not performed. The reference-point specification unit specifies, as the corner antenna reference point, the measurement point acquired at a timing at which the lifting/lowering device changes the planting unit from the lowered position to the lifted position.

As a result, an accurate corner candidate point can be registered even when the region is registered while planting work is being performed by the planting unit of the rice seedling transplanter. Furthermore, positions in which planting work can actually be performed can be included in the region.

DESCRIPTION OF EMBODIMENTS

Next, an embodiment of the present invention will be described with reference to the drawings. The region registration system 100 of the present embodiment is a system for causing a rice seedling transplanter 1 that plants rice (plants seedlings) inside a field to perform autonomous driving. Here, autonomous driving refers to causing the rice seedling transplanter 1 to travel while at least the steering is performed in an autonomous fashion. In the present embodiment, an operator uses a wireless communication terminal 7 to perform settings relating to autonomous driving, and the rice seedling transplanter 1 performs autonomous driving based on the settings. Furthermore, although the present embodiment has a configuration in which the rice seedling transplanter 1 performs autonomous driving while the operator is on board, it is also possible for the rice seedling transplanter 1 to perform autonomous driving while the operator is not on board.

Figure 1:
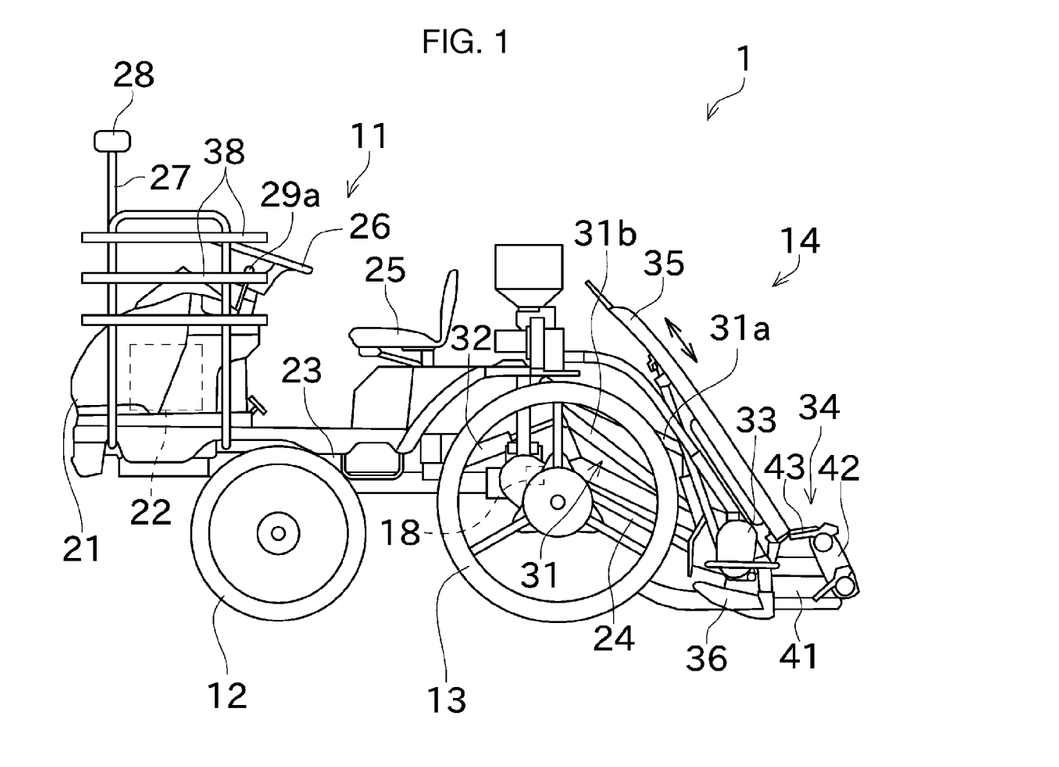
FIG. 1 is a side view of a rice seedling transplanter provided in a region registration system according to an embodiment of the present invention.
Figure 2:
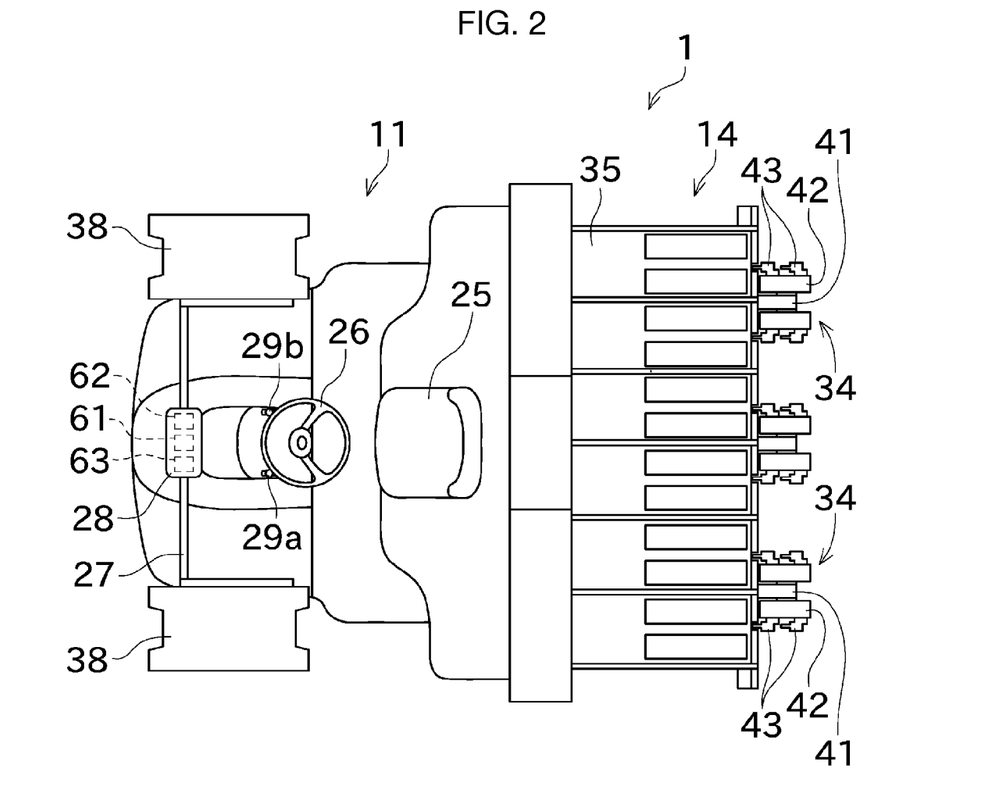
FIG. 2 is a plan view of the rice seedling transplanter.

First, the rice seedling transplanter 1 of the present embodiment will be described with reference to FIG. 1 and FIG. 2. FIG. 1 is a side view of the rice seedling transplanter 1. FIG. 2 is a plan view of the rice seedling transplanter 1. As shown in FIG. 1 and FIG. 2, the rice seedling transplanter 1 includes a vehicle body portion 11, a pair of left and right front wheels 12, a pair of left and right rear wheels 13, and a planting unit 14.

An engine (drive unit) 22 is arranged inside a bonnet 21 arranged at the front portion of the vehicle body portion 11. The power generated by the engine 22 is transmitted to at least one of the front wheels 12 and the rear wheels 13 via a transmission case 23. The power transmitted via the transmission case 23 is also transmitted to the planting unit 14 via a PTO shaft 24 arranged at the rear portion of the vehicle body portion 11. The PTO shaft 24 is configured so that power is transmitted to it via a planting clutch (working clutch) 18. A driver's seat 25 that seats the operator is provided at a position between the front wheels 12 and the rear wheels 13 in the front-rear direction of the vehicle body portion 11.

Operation tools such as a steering wheel 26, a main shift lever 29a, and a planting clutch lever 29b are arranged in front of the driver's seat 25. The steering wheel 26 is an operation tool for changing the steering angle of the rice seedling transplanter 1. The main shift lever 29a is configured so that at least "forward movement", "backward movement", and "seedling planting" positions can be selected. When the main shift lever 29a is operated to the "forward movement" position, power is transmitted so that the rear wheels 13 rotate in a direction that moves the rice seedling transplanter 1 forward. On the other hand, when the main shift lever 29a is operated to the "backward movement" position, power is driven so that the rear wheels 13 rotate in a direction that moves the rice seedling transplanter 1 backward. When the main shift lever 29a is operated to the "seedling planting" position, the transmission of power to the rear wheels 13 and the PTO shaft 24 is cut off. Furthermore, by operating the planting clutch lever 29b, it is possible to switch between a clutched state, in which the planting clutch 18 transmits power to the PTO shaft 24 (that is to say, the planting unit 14), and a declutched state, in which the planting clutch 18 does not transmit power to the PTO shaft 24 (that is to say, the planting unit 14).

The planting unit 14 is joined to the rear of the vehicle body portion 11 via a lifting/lowering link mechanism 31. The lifting/lowering link mechanism 31 is configured by a parallel link structure including a top link 31a, a lower link 31b, and the like. A lifting/lowering cylinder (lifting/lowering device) 32 is joined to the lower link 31b. With this configuration, the entire planting unit 14 can be vertically lifted and lowered by expanding and contracting the lifting/lowering cylinder 32. As a result, the height of the planting unit 14 can be changed between a lowered position, where the planting unit 14 is lowered to perform planting work, and a lifted position, where the planting unit 14 is lifted and planting work is not performed. Although the lifting/lowering cylinder 32 is a hydraulic cylinder, it is also possible to use an electric cylinder. Furthermore, a configuration may be used in which the planting unit 14 is lifted and lowered by an actuator other than a cylinder.

The planting unit 14 mainly includes a planting input case 33, a plurality of planters 34, a seedling stand 35, a plurality of floats 36, and spare seedling stands 38.

Each of the planters 34 include a planting transmission case 41 and a rotating case 42. Power is transmitted to the planting transmission cases 41 via the PTO shaft 24 and the planting input case 33. Each of the planting transmission cases 41 has a rotating case 42 attached on both sides in the width direction of the vehicle. Two planting claws 43 are attached to each of the rotating cases 42 side by side in the traveling direction of the rice seedling transplanter 1. One row of planting is performed by the two planting claws 43.

As shown in FIG. 1, the seedling stand 35 is arranged in front of and above the planter 34, and is configured so that a seedling mat can be placed thereon. The seedling stand 35 is configured to be laterally movable (slidable in the lateral direction) in a reciprocal fashion. Furthermore, the seedling stand 35 is configured so that the seedling mat can be intermittently fed vertically downward at the ends of the reciprocal movement of the seedling stand 35. As a result of this configuration, the seedling stand 35 is capable of supplying the seedlings on the seedling mat to each of the planters 34. In this way, the rice seedling transplanter 1 is capable of successively supplying seedlings to each of the planters 34, and can continuously plant seedlings.

The float 36 shown in FIG. 1 is provided at the bottom part of the planting unit 14, and is arranged so that the lower surface thereof can make contact with the ground. As a result of the float 36 making contact with the ground, the surface of the rice field before planting the seedlings is leveled. Furthermore, the float 36 is provided with a float sensor (not shown) that detects the swing angle of the float 36. The swing angle of the float 36 corresponds to the distance between the ground and the planting unit 14. The rice seedling transplanter 1 is capable of keeping the height of the planting unit 14 with respect to the ground constant by operating the lifting/lowering cylinder 32 based on the swing angle of the float 36 to vertically lift and lower the planting unit 14.

The spare seedling stands 38 are arranged on the outside of the bonnet 21 in the width direction of the vehicle, and can be equipped with a seedling box accommodating spare mat seedlings. The upper parts of the pair of left and right spare seedling stands 38 are joined to each other by a joining frame 27 that extends in the vertical direction and the width direction of the vehicle. A casing 28 is arranged at the center of the joining frame 27 in the width direction of the vehicle. A positioning antenna 61, an inertial measurement device 62, and a communication antenna 63 are arranged inside the casing 28. The positioning antenna 61 is capable of receiving radio waves from the positioning satellites that constitute a satellite positioning system (GNSS). The position of the rice seedling transplanter 1 can be acquired by performing a known positioning calculation based on the radio waves. The inertial measurement device 62 includes three gyro sensors (angular velocity sensors) and three acceleration sensors. The accuracy of the positioning result of the rice seedling transplanter 1 is improved by using, in an auxiliary fashion, the angular velocity and the acceleration of the rice seedling transplanter 1 detected by the inertial measurement device 62. The communication antenna 63 is an antenna for performing wireless communication with the wireless communication terminal 7.

Figure 3:
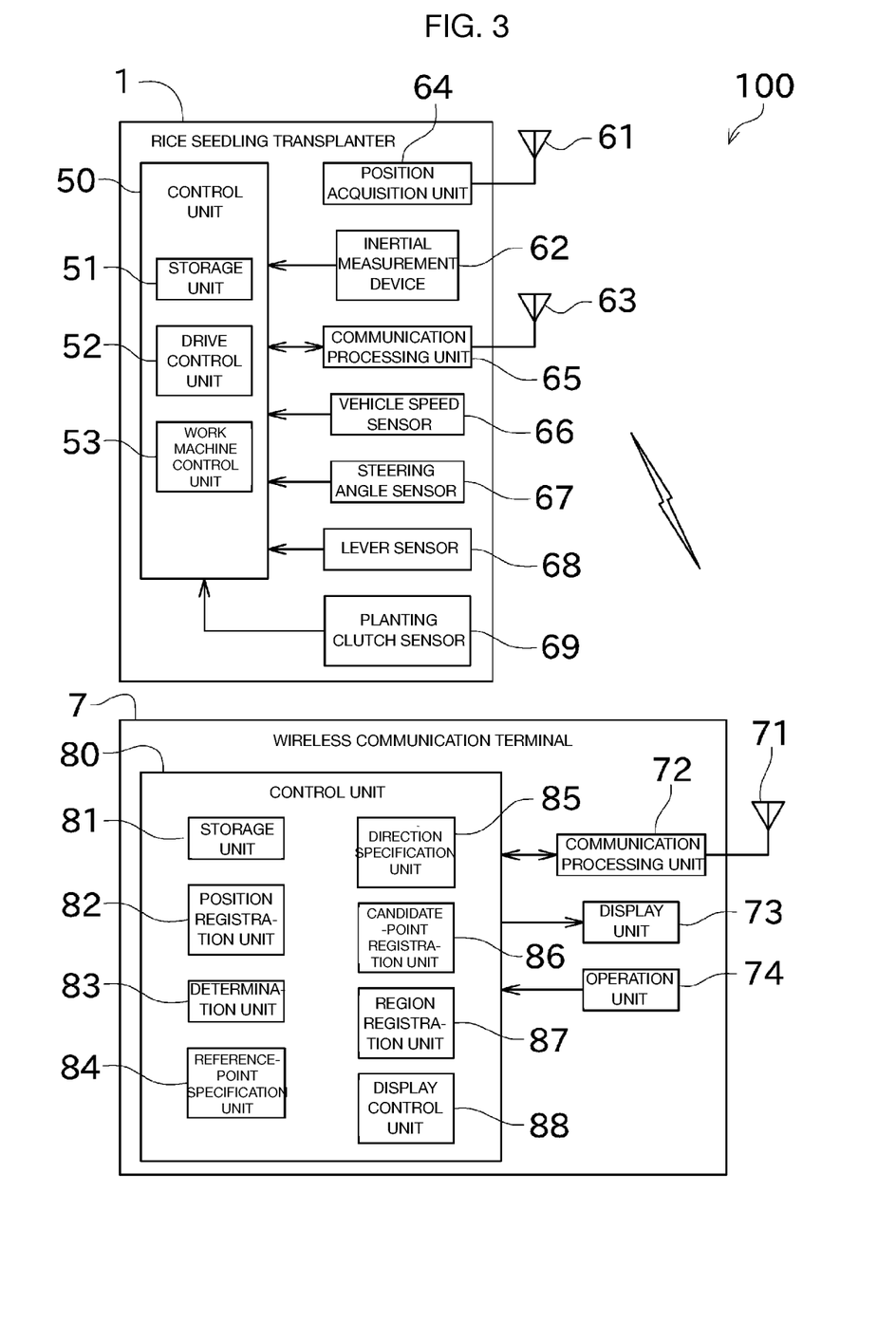
FIG. 3 is a block diagram of the region registration system.

As shown in FIG. 3 the rice seedling transplanter 1 includes a control unit 50. The control unit 50 is configured as a known computer, and includes a CPU, a non-volatile memory, a RAM, an input/output unit, and the like (not shown). Various programs, data, and the like are stored in the non-volatile memory. The CPU can read and execute various programs from the non-volatile memory. As a result of cooperation between the above hardware and software, the control unit 50 is capable of being operated as a storage unit 51, a drive control unit 52, and a work machine control unit 53. The control unit 50 may be a single piece of hardware, or a plurality of pieces of hardware that can communicate with each other. Furthermore, in addition to the inertial measurement device 62 described above, a position acquisition unit 64, a communication processing unit 65, a vehicle speed sensor 66, a steering angle sensor 67, a lever sensor 68, and a planting clutch sensor 69 are connected to the control unit 50.

The position acquisition unit 64 is electrically connected to the positioning antenna 61. The position acquisition unit 64 acquires the position of the rice seedling transplanter 1 in a form such as latitude and longitude information from a positioning signal based on the radio waves received by the positioning antenna 61. The position acquisition unit 64 receives a positioning signal from a reference station (not shown) by an appropriate method, and then performs positioning using the known GNSS-RTK method. However, for example, positioning using a differential GNSS, independent positioning, or the like may be performed instead.

Alternatively, position acquisition based on the radio wave strength of a wireless LAN or the like, or position acquisition by inertial navigation or the like may be performed.

The communication processing unit 65 is electrically connected to the communication antenna 63. The communication processing unit 65 is capable of performing data transmission and reception with the wireless communication terminal 7 by performing modulation processing or demodulation processing by an appropriate method.

The vehicle speed sensor 66 is arranged on an appropriate position of the rice seedling transplanter 1, such as on the axle of the front wheels 12. The vehicle speed sensor 66 is configured so that, for example, a pulse is generated according to the rotation of the axle. The detection result data obtained by the vehicle speed sensor 66 is output to the control unit 50.

The steering angle sensor 67 is a sensor that detects the steering angle of the front wheels 12. The steering angle sensor 67 is provided, for example, on a kingpin (not shown) provided on the front wheels 12. The detection result data obtained by the steering angle sensor 67 is output to the control unit 50. A configuration may be used in which the steering angle sensor 67 is provided on the steering wheel 26.

The lever sensor 68 is a sensor that detects the operation position of the main shift lever 29a described above. The detection result of the lever sensor 68 is output to the control unit 50. The control unit 50 is capable of specifying the switching timing from forward movement to backward movement, and the switching timing from backward movement to forward movement based on the detection result of the lever sensor 68. It is also possible to specify the switching timing between forward movement and backward movement based on the change in the position of the rice seedling transplanter 1 acquired by the position acquisition unit 64 instead of the detection value of the lever sensor 68.

The planting clutch sensor 69 is a sensor that detects the operation position of the planting clutch lever 29b described above. The detection result of the planting clutch sensor 69 is output to the control unit 50. The control unit 50 is capable of specifying the start timing and end timing of planting work based on the detection result of the planting clutch sensor 69.

The drive control unit 52 performs vehicle speed control and steering control of the rice seedling transplanter 1. Although the drive control unit 52 is capable of performing vehicle speed control and steering control at the same time, it may also perform only one of these. For example, if the drive control unit 52 only performs steering control, the vehicle speed is manually controlled by the operator.

The vehicle speed control is a control that adjusts the vehicle speed of the rice seedling transplanter 1 based on predetermined conditions. Specifically, the drive control unit 52 changes at least one of the gear ratio of the transmission device inside the transmission case 23 and the rotation speed of the engine 22 so that the current vehicle speed obtained from the detection result of the vehicle speed sensor 66 approaches a target vehicle speed. The vehicle speed control also includes a control that reduces the vehicle speed to zero and stops the rice seedling transplanter 1.

The steering control is a control that adjusts the steering angle of the rice seedling transplanter 1 based on predetermined conditions. Specifically, the drive control unit 52 drives, for example, a steering actuator provided in the rotation shaft (steering shaft) of the steering wheel 26 so that the current steering angle obtained from the detection result of the steering angle sensor 67 approaches a target steering angle. The drive control unit 52 may have a configuration that directly adjusts the steering angle of the front wheels 12 of the rice seedling transplanter 1 rather than the rotation angle of the steering wheel 26.

The work machine control unit 53 is capable of controlling the operations (lifting/lowering operations, planting work, and the like) of the planting unit 14 based on predetermined conditions.

The wireless communication terminal 7 is a tablet-type computer. The wireless communication terminal 7 includes a communication antenna 71, a communication processing unit 72, a display unit 73, an operation unit 74, and a control unit 80. The wireless communication terminal 7 is not limited to a tablet-type computer, and may be a smartphone or a notebook computer. Although the wireless communication terminal 7 performs various processing relating to autonomous driving of the rice seedling transplanter 1 as described below, at least part of the processing can be performed by an arithmetic device of the rice seedling transplanter 1. Conversely, at least part of the various processing relating to autonomous driving performed by the rice seedling transplanter 1 may be performed by the wireless communication terminal 7.

The communication antenna 71 includes a short-range communication antenna for performing wireless communication with the rice seedling transplanter 1, and a mobile communication antenna for performing communication using a mobile phone line and the Internet. The communication processing unit 72 is electrically connected to the communication antenna 71. The communication processing unit 72 is capable of performing data transmission and reception with the wireless communication terminal 7 or other devices by performing modulation processing or demodulation processing by an appropriate method. Therefore, for example, some of the information stored in the control unit 50 or the control unit 80 may be stored in an external server.

The display unit 73 is a liquid crystal display or an organic EL display or the like, and is configured to be capable of displaying an image. The display unit 73 is capable of displaying, for example, information relating to autonomous driving, information relating to the settings of the rice seedling transplanter 1, the detection results of various sensors, warning information, and the like. The operation unit 74 includes a touch panel and a hardware key. The touch panel is arranged so as to overlap the display unit 73, and is capable of detecting an operation performed by the operator's finger or the like. The hardware key is arranged on a side surface of the casing of the wireless communication terminal 7 or on the periphery of the display unit 73 or the like, and can be operated by being pressed by the operator. The wireless communication terminal 7 may include only one of the touch panel and the hardware key.

The control unit 80 is configured as a known computer, and includes a CPU, a non-volatile memory, a RAM, an input/output unit, and the like (not shown). Various programs, data, and the like are stored in the non-volatile memory. The CPU can read and execute various programs from the non-volatile memory. As a result of cooperation between the above hardware and software, the control unit 80 is capable of being operated as a storage unit 81, a position registration unit 82, a determination unit 83, a reference-point specification unit 84, a direction specification unit 85, a candidate-point registration unit 86, a region registration unit 87, and a display control unit 88. The processing performed by each unit of the control unit 80 will be described later.

Figure 4:
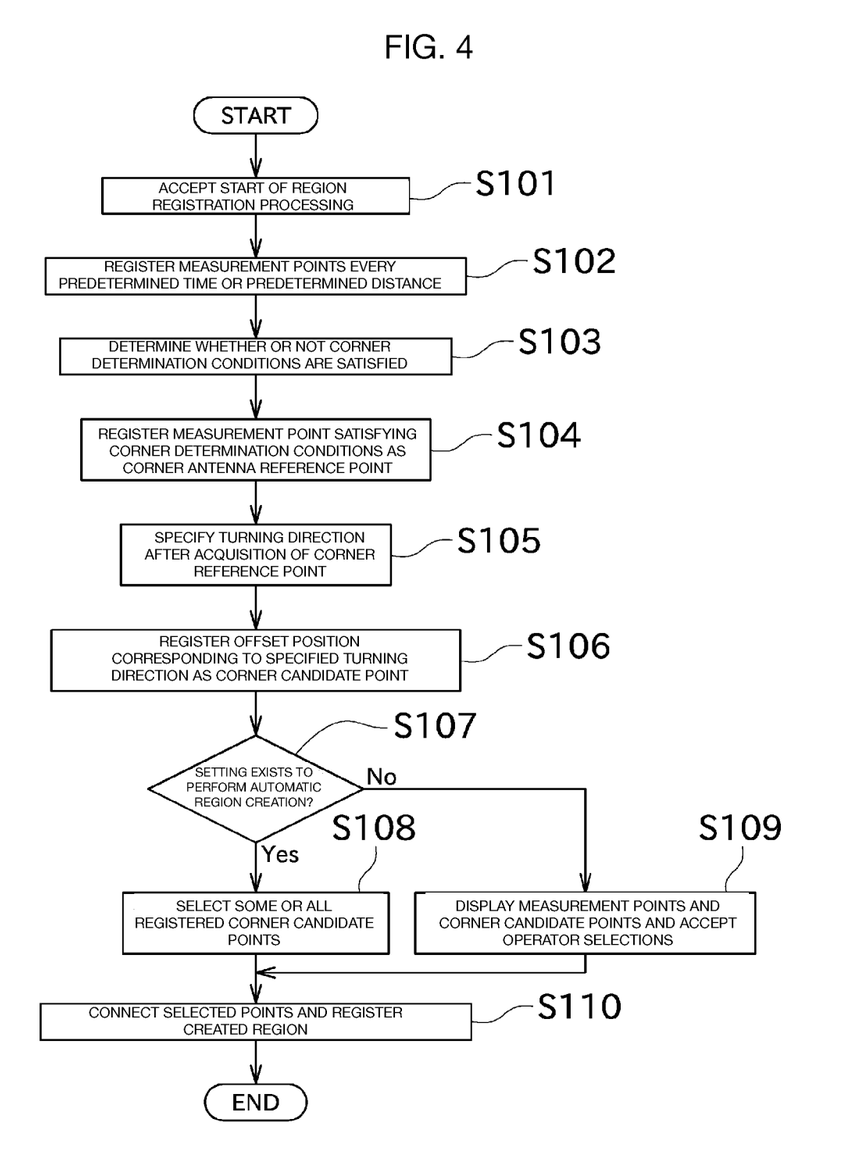
FIG. 4 is a flowchart showing region registration processing.
Figure 5:
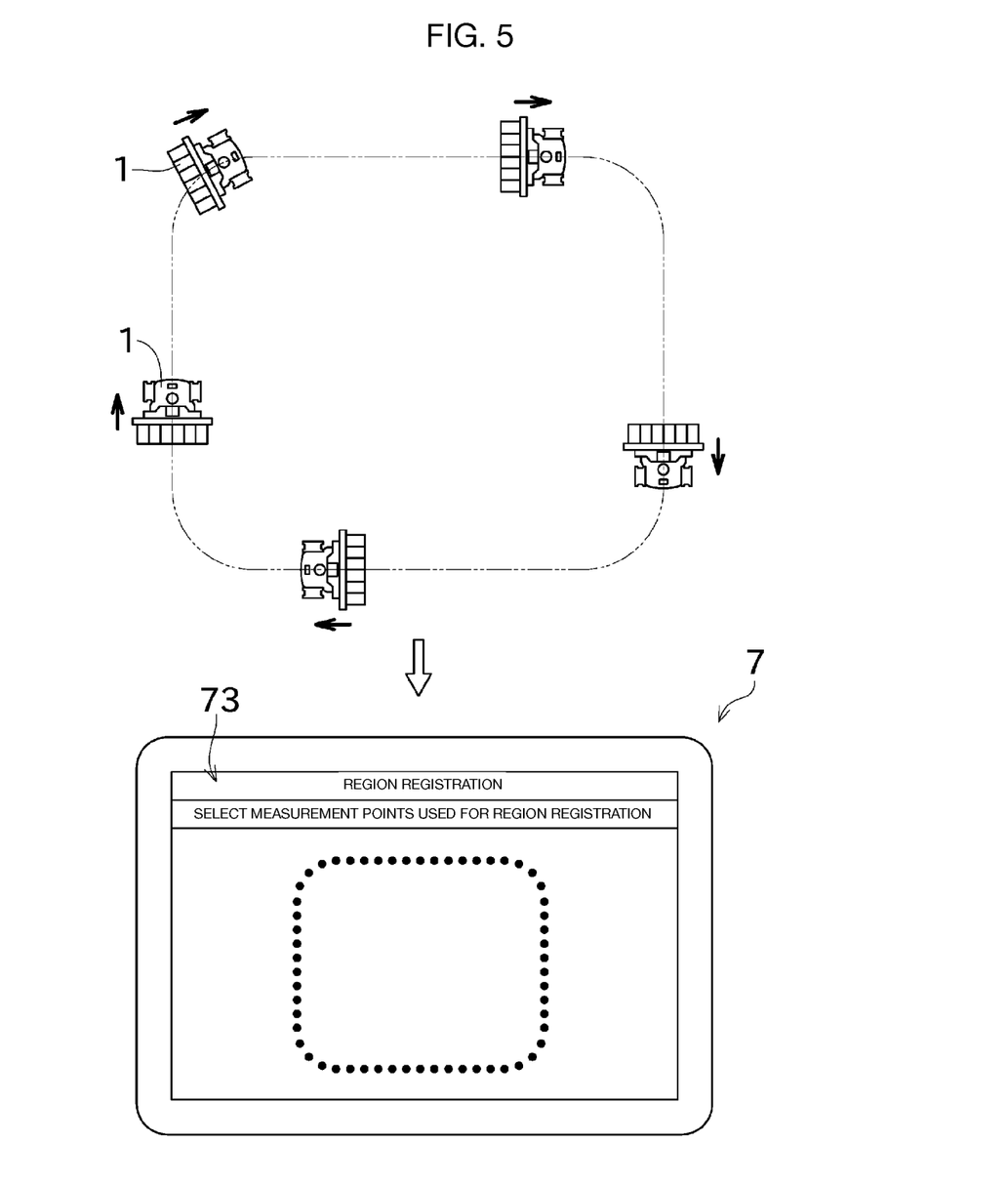
FIG. 5 is an explanatory diagram showing an outline of region registration processing.
Figure 6:
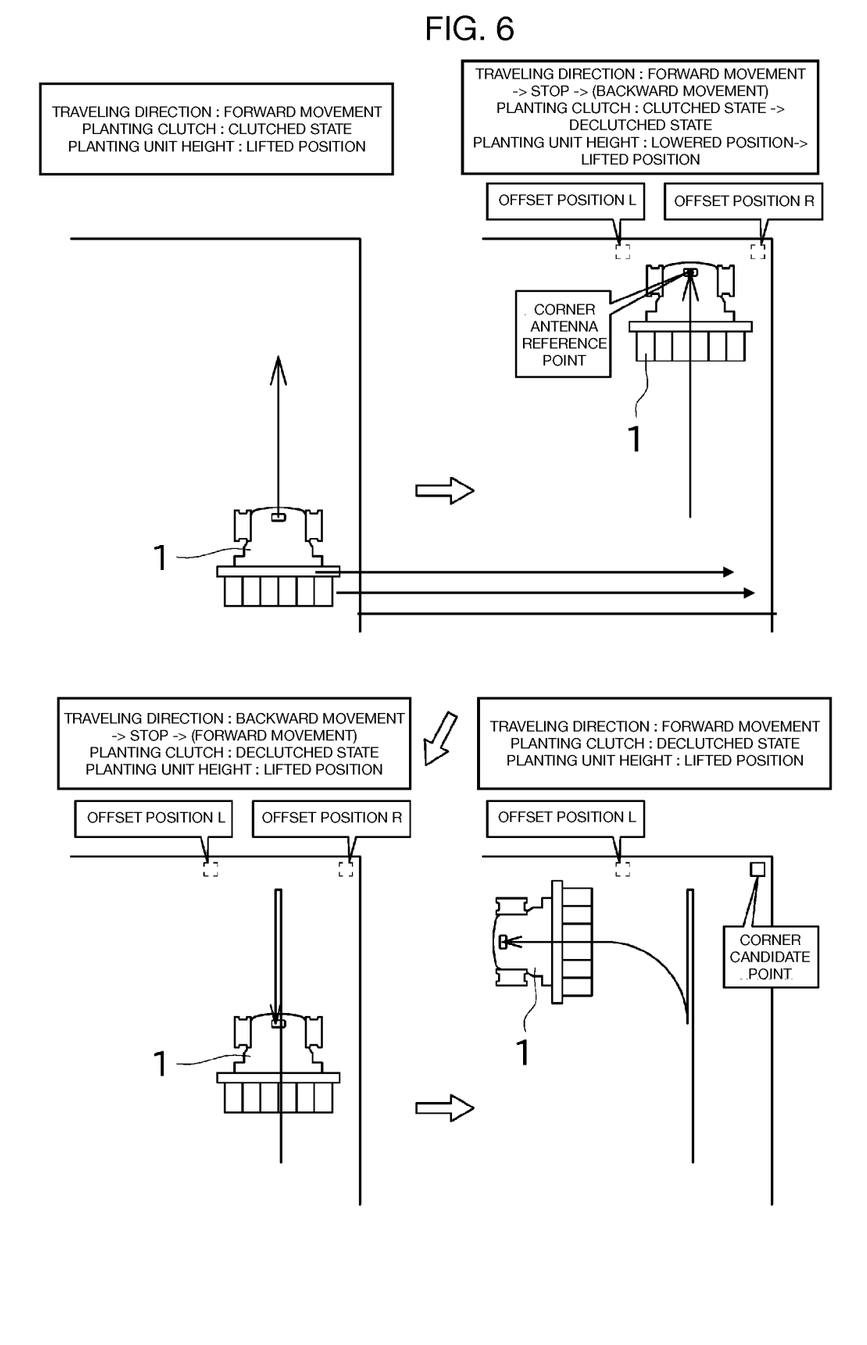
FIG. 6 is a diagram showing corner determination conditions relating to switching between forward movement and backward movement.
Figure 7:
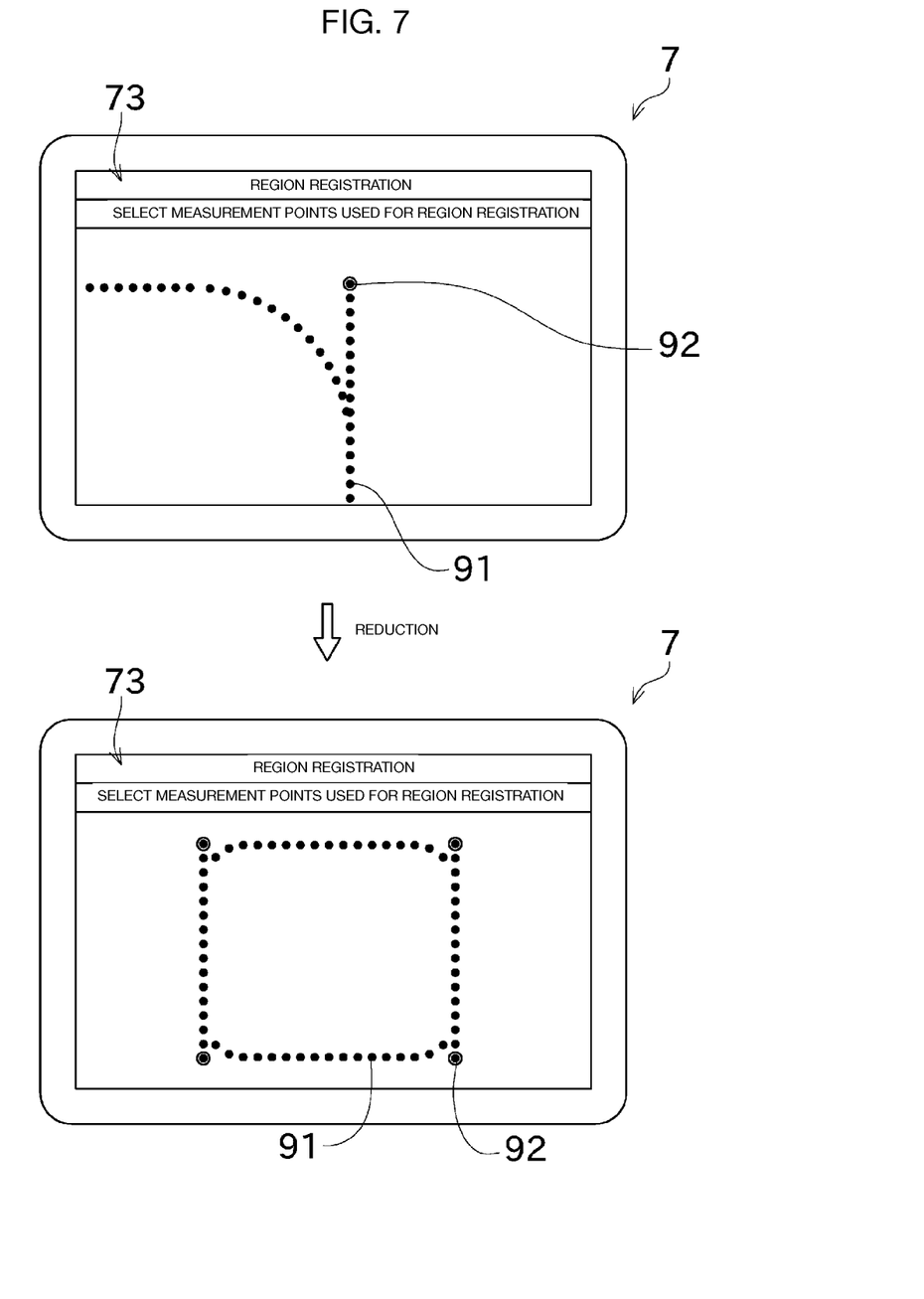
FIG. 7 is a diagram showing corner determination conditions based on the state of the planting clutch.

Next, the processing that creates and registers a region (region registration processing) will be described with reference to FIG. 4 to FIG. 7. FIG. 4 is a flowchart showing the region registration processing. FIG. 5 is an explanatory diagram showing an outline of the region registration processing. FIG. 6 is a diagram describing a specific example of corner determination conditions. FIG. 7 is a diagram showing a measurement point selection screen used in the region registration.

In the present embodiment, although a working region (a region to be planted) inside a field is registered as the region, it is also possible to register the entire field, which includes the working region and a non-working region (headland), instead of or in addition to the working region.

Furthermore, the registered region is used for creating an autonomous driving route or for registering a work history.

First, a summary of the region registration processing and two conventional problems will be described with reference to FIG. 5 and FIG. 6. As shown in the upper side of FIG. 5, the operator causes the rice seedling transplanter 1 to actually travel along the outer periphery of the region which the operator desires to register. The positions (more specifically, the position of the positioning antenna 61) acquired while the rice seedling transplanter 1 is traveling are registered as measurement points. Then, after the rice seedling transplanter 1 has traveled along the outer periphery, points which indicate the positions that the rice seedling transplanter 1 has traveled are displayed on the wireless communication terminal 7 as shown in the lower side of FIG. 5. Then, the region is created and registered by connecting a plurality of points selected by the operator from among the measurement points.

Here, even when the region which the operator desires to register has a rectangular shape, because the rice seedling transplanter 1 is unable to turn at a right angle, it has to turn gradually as shown in FIG. 5. However, the registration of the largest possible field or working region or the like is desired by the operator, and further, it is preferable that the corners are close to right angles in consideration of the creation of an autonomous driving route.

Therefore, the operator may cause the rice seedling transplanter 1 to travel as described below. That is to say, as shown in FIG. 6, the rice seedling transplanter 1 is moved forward to the edge of the region, and the rice seedling transplanter 1 is positioned at the edge of the region. Then, the rice seedling transplanter 1 is moved backward, and then turned while moving forward again. However, when the rice seedling transplanter 1 travels in such a manner, the rice seedling transplanter 1 travels several times near the edge of the region. Therefore, when the measurement points are displayed on the wireless communication terminal 7, the measurement points become concentrated. Furthermore, when only some of the measurement points are displayed in order to avoid concentration of the measurement points, there is a possibility that the necessary measurement points (measurement points at the edge of the region) may not be displayed. In this manner, the first problem is that the measurement points become hidden.

In addition, because the measurement points of the rice seedling transplanter 1 represent the positions of the positioning antenna 61, and the positioning antenna 61 is positioned at the center of the width direction of the vehicle, it is not possible to match the positioning antenna 61 with the edge of the region. Therefore, in the region registration system 100, a position in which the position of the positioning antenna 61 is offset is taken as the corner of the region. However, because the procedure of offsetting the position of the positioning antenna 61 needs to be performed for each corner, the burden on the user increases when this procedure is performed by the user. In this manner, the second problem is that the offsetting procedure is complicated.

In consideration of the above, in the present embodiment, the first problem is resolved by registering a corner candidate point based on a measurement point that has a high probability of corresponding to the corner of the region, and handling this point in a different manner to the other measurement points. Furthermore, the second problem is resolved by automating the processing that offsets the position of the positioning antenna 61 and calculates the corner candidate point. This is described in detail below.

When the wireless communication terminal 7 receives an instruction from the operator to start region registration, it accepts the instruction (S101). Then, after boarding the rice seedling transplanter 1 and performing an operation with respect to the wireless communication terminal 7 to start the region registration, the operator causes the rice seedling transplanter 1 to travel along the outer periphery of the region which is desired be registered.

The wireless communication terminal 7 (position registration unit 82) registers, in the storage unit 81, the positions of the position acquisition unit 64 acquired at predetermined times or at predetermined distances by the position acquisition unit 64 while the rice seedling transplanter 1 is traveling as measurement points (S102). Furthermore, in the present embodiment, although the processing that registers measurement points is performed on the wireless communication terminal 7 side, a configuration is also possible in which the rice seedling transplanter 1 side (for example, the control unit 50) registers the measurement points.

Next, the wireless communication terminal 7 (determination unit 83) determines whether or not the measurement points satisfy the corner determination conditions (S103). The corner determination conditions are conditions for specifying a corner of the field (a section in which the direction of the outline significantly changes, or a section in which the outline is significantly bent or curved). The determination unit 83 may be configured to perform the processing of step S103 while the rice seedling transplanter 1 is traveling along the outer periphery of the region, or may be configured to perform the processing of step S103 after the rice seedling transplanter 1 has traveled along the outer periphery of the region (that is to say, after all of the measurement points have been acquired). As an example, the corner determination conditions set in the present embodiment are conditions which are based on the operations of the rice seedling transplanter 1 (operations relating to travel, operations relating to planting, and other operations).

Next, the corner determination conditions will be described with reference to FIG. 6.

When the rice seedling transplanter 1 travels as described above by the method shown in FIG. 6, the rice seedling transplanter 1 is moved forward (FIG. 6, upper left) and the rice seedling transplanter 1 is matched with the edge of the region (FIG. 6, upper right). Then, after moving the rice seedling transplanter 1 backward (FIG. 6, lower left), it is moved forward and turned along the edge of the region (FIG. 6, lower right). The upper right of FIG. 6 shows a state directly before the backward movement is started, or a state directly after the backward movement has been started. Furthermore, in the present embodiment, although the rice seedling transplanter 1 registers the region while performing planting work, it may register the region without performing planting work.

In the present embodiment, in order to detect that the rice seedling transplanter 1 has been moved forward to match the edge of the region, a determination is made using conditions relating to (1) a change in the traveling direction, (2) switching of the planting clutch 18, and (3) switching of the height of the planting unit 14. That is to say, (1) to (3) represent the corner determination conditions of the present embodiment.

(1) The change in the traveling direction is a condition which is set in consideration of the fact that the rice seedling transplanter 1 is moved backward after being moved forward to the edge of the region. Therefore, condition (1) is set such that it is satisfied when the rice seedling transplanter 1 is moved backward after being moved forward. Specifically, the determination unit 83 acquires the detection result of the lever sensor 68, and determines whether or not the corner determination condition has been satisfied based on whether or not the main shift lever 29a has been switched from forward movement to backward movement. Therefore, in the state shown in the upper right of FIG. 6, the determination unit 83 determines that condition (1) is satisfied. If the orientation of the rice seedling transplanter 1 can be specified, it is also possible to determine whether the switch from forward movement to backward movement has been made based on changes in the positions of the measurement points.

(2) The switching of the planting clutch 18 is a condition which is set in consideration of the fact that the rice seedling transplanter 1 is moved forward while performing planting work, and the planting work is interrupted upon reaching the edge of the region. In other words, because the rice seedling transplanter 1 repeatedly moves forward and backward within the same area, the planting clutch sensor 69 is switched to the declutched state after reaching the edge of the region. Therefore, condition (2) is set such that it is satisfied when the planting clutch 18 is switched from the clutched state to the declutched state. Specifically, the determination unit 83 acquires the detection result of the planting clutch sensor 69, and calculates based on the detection result whether switching has occurred from the clutched state to the declutched state.

(3) The switching of the height of the planting unit 14 is a condition which is set in consideration of the fact that the rice seedling transplanter 1 is moved forward while performing planting work, and the planting unit 14 is lifted upon reaching the edge of the region. As a result of lifting the planting unit 14, for example, the planting unit 14 is less likely to collide with ridges and the like while turning. Furthermore, as mentioned above, because planting work is not performed after the rice seedling transplanter 1 reaches the edge of the region, it is possible for the planting unit 14 to be lifted. Therefore, condition (3) is set such that it is satisfied when the position of the planting unit 14 is changed from the lowered position to the lifted position. Specifically, the determination unit 83 acquires the detection result of the operation status of the lifting/lowering cylinder 32 or the like, and calculates based on the detection result whether or not switching has occurred from the lowered position to the lifted position. The switching of the height of the planting unit 14 may be detected by a sensor or the like attached to a lever operated by the operator in order to switch the height of the planting unit 14.

The determination unit 83 of the present embodiment determines that the corner determination conditions are satisfied when two of the three conditions described above are satisfied. A setting may be used in which the corner determination conditions are satisfied when all three of the conditions described above are satisfied, and conditions other than the three conditions described above may also be set.

Next, the wireless communication terminal 7 (reference-point specification unit 84) calculates a corner antenna reference point and registers it in the storage unit 81 (S104). The corner antenna reference point is the measurement point (that is to say, the position of the positioning antenna 61) at the time the corner determination conditions are satisfied.

Next, the wireless communication terminal 7 (direction specification unit 85) specifies a turning direction after the acquisition of the corner antenna reference point (S105). The turning direction is information indicating whether the rice seedling transplanter 1 is moving left or right as it passes the corner represented by the corner antenna reference point. The turning direction can be specified, for example, by the path of the rice seedling transplanter 1 indicated by the measurement points. The turning direction can also be specified based on the detection result of the steering angle sensor 67. Furthermore, for example, if the region of the registration target is not rectangular, the amount of change in the traveling direction is less than 90 degrees even when the rice seedling transplanter 1 passes the corner. Even in this case, the turning direction is specified as being either left or right. Moreover, for example, although a plurality of turns is performed when the rice seedling transplanter 1 cuts back after being unable to complete the turn in a single turning operation, even in this case the turning direction is finally specified as being either left or right based on the traveling direction or the like before passing and after passing the corner.

Then, the wireless communication terminal 7 (candidate-point registration unit 86) registers an offset position in accordance with the turning direction specified by the direction specification unit 85 as a corner candidate point (S106). The offset position is a point in which the corner antenna reference point has been offset forward of the rice seedling transplanter 1 and toward either side in the width direction of the vehicle at the time the corner antenna reference point was measured. As shown in FIG. 6, in the present embodiment, an offset position L, which is offset forward and to the left, and an offset position R, which is offset forward and to the right, are set as shown in the lower right of FIG. 6. Furthermore, the offset positions are determined based on the width direction size of the rice seedling transplanter 1. The distance and the like to the offset position from the antenna position may be set, for example, by the operator. Moreover, if the rice seedling transplanter 1 has turned to the left side, the candidate-point registration unit 86 sets the offset position on the right side as the corner candidate point. In other words, of the pair of left and right offset positions, the offset position on the opposite side to the turning direction is set as the corner candidate point. This eliminates the need for the operator to manually select the offset position, and the corner candidate point can be automatically registered.

Next, the wireless communication terminal 7 determines whether or not a setting exists to perform automatic region creation (S107). Automatic region creation is processing that creates a region by automatically selecting some or all of the corner candidate points registered by the candidate-point registration unit 86. Although the operator can set in advance that automatic region creation is to be performed, the operator may also select whether or not to perform automatic region creation each time a region is created.

If a setting exists to perform automatic region creation, the wireless communication terminal 7 selects some or all of the registered corner candidate points (S108). On the other hand, if a setting does not exist to perform automatic region creation, as shown in FIG. 7, the wireless communication terminal 7 (display control unit 88) displays the measurement points and the corner candidate points, and accepts selections from the operator (S109).

The wireless communication terminal 7 in FIG. 7 is displaying measurement points 91 and corner candidate points 92. As shown in FIG. 7, the display control unit 88 displays the corner candidate point marks 92 on the display unit 73 with a different shape to that of the measurement point marks 91. The corner candidate point marks 92 are at least displayed in a different form to the measurement point marks 91, and for example, it is possible to use different colors, or a display in which only the corner candidate point marks 92 are flashing. At the time of selection by the operator, if a section which is close to both a measurement point mark 91 and a corner candidate point mark 92 is selected, the corner candidate point mark 92 may be preferentially activated.

Furthermore, as shown in FIG. 7, when the scale is reduced to widen the displayed region, the positions of the measurement point marks 91 become too close together and form a straight line if the measurement point marks 91 and the like are drawn at the same interval as when enlarged (upper side). Therefore, processing is performed that displays only some of the points, and hides the remaining points. Here, in the present embodiment, a setting is in place that prevents the corner candidate points from being thinned out even after the thinning processing has been performed. Therefore, even when scale reduction processing is performed, the operator is able to select the corner candidate points and confirm the positions of the corner candidate points.

As described above, the region registration system 100 of the present embodiment, in order to register a region representing all or part of a field, causes the rice seedling transplanter 1 to travel along an outer periphery of the region, thereby registering the region. The region registration system 100 includes a positioning antenna 61, a position registration unit 82, a reference-point specification unit 84, a direction specification unit 85, a candidate-point registration unit 86, and a region registration unit 87. The positioning antenna 61 is attached to the rice seedling transplanter 1, and receives a positioning signal from a positioning system. The position registration unit 82 registers, based on the positioning signal, an antenna position representing a position of the positioning antenna 61 as a measurement point. The reference-point specification unit 84 specifies a corner antenna reference point, which is a measurement point taken while the rice seedling transplanter 1 is traveling along the outer periphery of the region, and is a position that has been determined to correspond to a corner of the region. The direction specification unit 85 specifies a turning direction of the rice seedling transplanter 1 after passing the corner antenna reference point. The candidate-point registration unit 86 offsets the corner antenna reference point to a position forward of the rice seedling transplanter 1 at the time of measuring the corner antenna reference point (at which time the rice seedling transplanter 1 is positioned at the corner antenna reference point), and registers, as a corner candidate point, a position offset toward either side in a vehicle width direction of the rice seedling transplanter 1 in accordance with the turning direction specified by the direction specification unit 85. The region registration unit 87 is capable of registering a region containing the corner candidate point.

As a result, because a position obtained by offsetting the position of the traveling rice seedling transplanter 1 by a predetermined amount is registered as a corner candidate point, it is possible to register the region based on a position that exists with certainty inside the field. Furthermore, as a result of changing the offset direction according to the turning direction, a position that corresponds to the actual region can be automatically registered.

Furthermore, in the region registration system 100 of the present embodiment, the reference-point specification unit 84 specifies, as the corner antenna reference point, the measurement point acquired at a timing at which the rice seedling transplanter 1 is switched from forward movement to backward movement.

When the rice seedling transplanter 1 is switched from forward movement to backward movement, a plurality of positions of the rice seedling transplanter 1 is registered before and after making the switch. Therefore, by using the measurement point acquired at the timing at which switching occurs from forward movement to reverse movement as the corner antenna reference point, it is possible to use only an appropriate position as the corner candidate point.

Furthermore, in the region registration system 100 of the present embodiment, the rice seedling transplanter 1 includes a planting unit 14, an engine 22, and a planting clutch 18. The planting unit 14 performs agricultural work. The engine 22 drives the planting unit 14. The planting clutch sensor 69 can be switched between a clutched state, in which power from the engine 22 is transmitted to the planting unit 14, and a declutched state, in which power from the engine 22 is not transmitted to the planting unit 14. The reference-point specification unit 84 specifies, as the corner antenna reference point, the measurement point acquired at a timing at which the planting clutch 18 is switched from the clutched state to the declutched state.

As a result, an accurate corner candidate point can be registered even when the region is registered while agricultural work is being performed by the planting unit 14. Furthermore, positions in which agricultural work can actually be performed can be included in the region.

Furthermore, in the region registration system 100 of the present embodiment, the rice seedling transplanter 1 is provided with a planting unit 14 that plants seedlings. The rice seedling transplanter 1 includes a lifting/lowering cylinder 32 that changes a height of the planting unit 14 between a lowered position, where the planting unit 14 is lowered to perform planting work, and a lifted position, where the planting unit 14 is lifted and planting work is not performed. The reference-point specification unit 84 specifies, as the corner antenna reference point, the measurement point acquired at a timing at which the lifting/lowering cylinder 32 changes the planting unit 14 from the lowered position to the lifted position.

As a result, an accurate corner candidate point can be registered even when the region is registered while planting work is being performed by the planting unit 14 of the rice seedling transplanter 1. Furthermore, positions in which planting work can actually be performed can be included in the region.

Although a preferred embodiment of the present invention has been described above, the above configuration can, for example, be changed as follows.

In the embodiment described above, although the rice seedling transplanter 1 and the wireless communication terminal 7 perform wireless communication, a configuration is possible in which they perform wired communication.

In the embodiment described above, although an example has been described in which the region registration system 100 has been applied to the rice seedling transplanter 1, the region registration system 100 can be applied to other agricultural work vehicles such as tractors and combines. For example, if the region registration system 100 is applied to a tractor, an attachment such as a cultivator corresponds to the working unit. Moreover, if the region registration system 100 is applied to a combine, a cutting unit or the like corresponds to the working unit.

DESCRIPTION OF REFERENCE NUMERALS

1 Rice seedling transplanter (work vehicle)
7 Wireless communication terminal
14 Planting unit (working unit)
18 Planting clutch (working clutch)
22 Engine (drive source)
32 Lifting/lowering cylinder (lifting/lowering device)
80 Control unit
81 Storage unit
82 Position registration unit
83 Determination unit
84 Reference-point specification unit
85 Direction specification unit
86 Candidate-point registration unit
87 Region registration unit
88 Display control unit
100 Region registration system

The invention claimed is:

1. A region registration system that, in order to register all or part of a region of a field, causes a work vehicle to travel along an outer periphery of the region, thereby registering the region, the region registration system including:
   a positioning antenna which is attached to the work vehicle, and receives a positioning signal from a positioning system;
   a position registration unit that registers, based on the positioning signal, an antenna position representing a position of the positioning antenna as a measurement point;
   a reference-point specification unit that specifies a corner antenna reference point, which is a measurement point taken while the work vehicle is traveling along the outer periphery of the region, and is a position that has been determined to correspond to a corner of the region;
   a direction specification unit that specifies a turning direction of the work vehicle after passing the corner antenna reference point;

a candidate-point registration unit that offsets the corner antenna reference point to a position forward of the work vehicle at the time of measuring the corner antenna reference point, and registers, as a corner candidate point, a position offset toward either side in a vehicle width direction of the work vehicle in accordance with the turning direction specified by the direction specification unit; and a region registration unit which is capable of registering a region containing the corner candidate point.

2. The region registration system according to claim 1, wherein the reference-point specification unit specifies, as the corner antenna reference point, the measurement point acquired at a timing at which the work vehicle is switched from forward movement to backward movement.

3. The region registration system according to claim 1, wherein the work vehicle includes a working unit that performs agricultural work, a drive unit that drives the working unit, and a working clutch that can be switched between a clutched state, in which power from the drive unit is transmitted to the working unit, and a declutched state, in which power from the drive unit is not transmitted to the working unit, and the reference-point specification unit specifies, as the corner antenna reference point, the measurement point acquired at a timing at which the working clutch is switched from the clutched state to the declutched state.

4. A region registration system according to claim 1, wherein the work vehicle is a rice seedling transplanter provided with a planting unit that plants seedlings, including a lifting/lowering device that changes a height of the planting unit between a lowered position, where the planting unit is lowered to perform planting work, and a lifted position, where the planting unit is lifted and planting work is not performed, and the reference-point specification unit specifies, as the corner antenna reference point, the measurement point acquired at a timing at which the lifting/lowering device changes the planting unit from the lowered position to the lifted position.

\* \* \* \* \*